United States Patent
Hanson

(10) Patent No.: US 12,486,015 B2
(45) Date of Patent: Dec. 2, 2025

(54) LOW IMPACT HAT STRINGER FLUID DAM

(71) Applicant: The Boeing Company, Arlington, VA (US)

(72) Inventor: Garrett C. Hanson, Chicago, IL (US)

(73) Assignee: The Boeing Company, Arlington, VA (US)

( * ) Notice: Subject to any disclaimer, the term of this patent is extended or adjusted under 35 U.S.C. 154(b) by 173 days.

(21) Appl. No.: 18/471,019

(22) Filed: Sep. 20, 2023

(65) Prior Publication Data

US 2024/0010322 A1   Jan. 11, 2024

Related U.S. Application Data

(62) Division of application No. 16/661,514, filed on Oct. 23, 2019, now Pat. No. 11,794,874.

(51) Int. Cl.
*B64C 3/18*  (2006.01)
*B64C 3/34*  (2006.01)

(52) U.S. Cl.
CPC ............. *B64C 3/182* (2013.01); *B64C 3/34* (2013.01)

(58) Field of Classification Search
CPC ............ B64C 3/34; B64C 3/182; B64D 37/10
See application file for complete search history.

(56) References Cited

U.S. PATENT DOCUMENTS

| | | | |
|---|---|---|---|
| 4,854,481 A | 8/1989 | Bohl | |
| 9,010,689 B1 * | 4/2015 | Brook | B64D 37/32 244/135 R |
| 9,382,014 B2 | 7/2016 | Brook | |
| 9,399,510 B2 | 7/2016 | Rolfes | |
| 10,023,321 B1 * | 7/2018 | Oyzerskiy | B64C 3/34 |
| 11,141,934 B2 | 10/2021 | Douglas | |
| 11,420,722 B2 | 8/2022 | Edwards | |
| 11,465,731 B2 | 10/2022 | Douglas | |
| 11,597,495 B2 | 3/2023 | Patterson | |
| 2005/0144874 A1 * | 7/2005 | West | B64D 37/06 52/459 |
| 2013/0009010 A1 | 1/2013 | Auriac | |
| 2015/0040349 A1 | 2/2015 | Malia | |
| 2015/0239570 A1 | 8/2015 | Brook | |

(Continued)

FOREIGN PATENT DOCUMENTS

| | | |
|---|---|---|
| EP | 3106384 A1 | 10/2018 |
| GB | 2575102 A | 1/2020 |
| WO | 2021122542 A1 | 6/2021 |

OTHER PUBLICATIONS

900 Moldable Silicone Putty—Grey, May 14, 2019, EFusing (Year: 2019).*

*Primary Examiner* — Joshua J Michener
*Assistant Examiner* — Ryan Andrew Yankey

(57) ABSTRACT

Examples for low impact hat stringer fluid dams are presented herein. An aircraft structure may include a wing with a vent stringer coupled to the wing. The vent stringer may include a center portion positioned between a first section and a second section. The center portion of the vent stringer includes a slot. A vent dam may be coupled within the vent stringer proximate the slot in the center portion. The vent dam can include a sealant coupled between an integrated pair of baffles such that a combination of the sealant and the integrated pair of baffles prevents fluid communication between the first section and the second section of the vent stringer.

20 Claims, 8 Drawing Sheets

(56) References Cited

U.S. PATENT DOCUMENTS

| | | | |
|---|---|---|---|
| 2016/0018000 A1* | 1/2016 | Busby | C08L 75/02 |
| | | | 277/650 |
| 2018/0031879 A1* | 2/2018 | Siddiqui | H10K 50/8426 |
| 2021/0129457 A1 | 5/2021 | Levine | |
| 2022/0380019 A1 | 12/2022 | Bryant | |

* cited by examiner

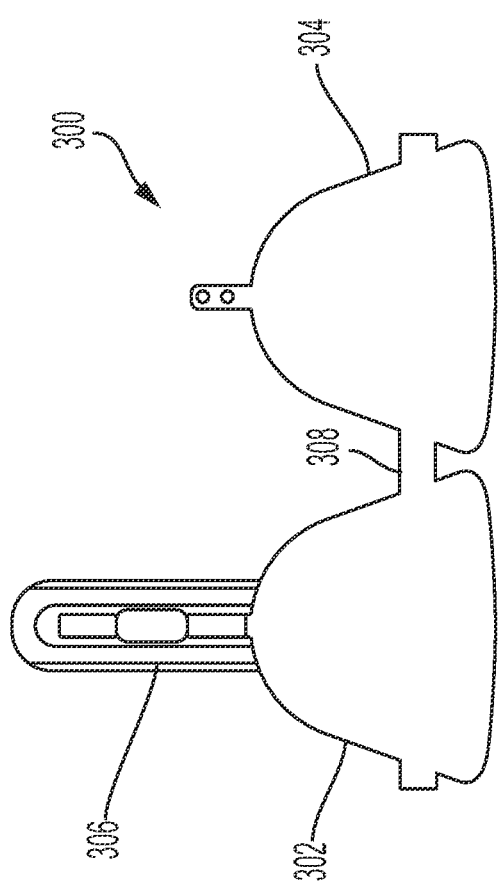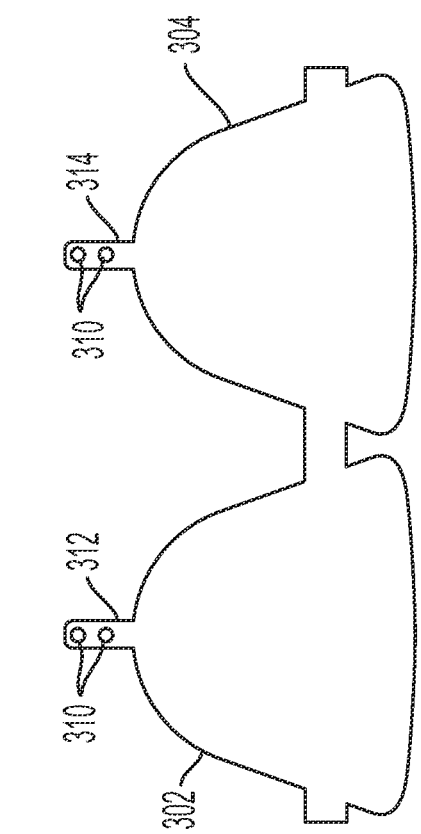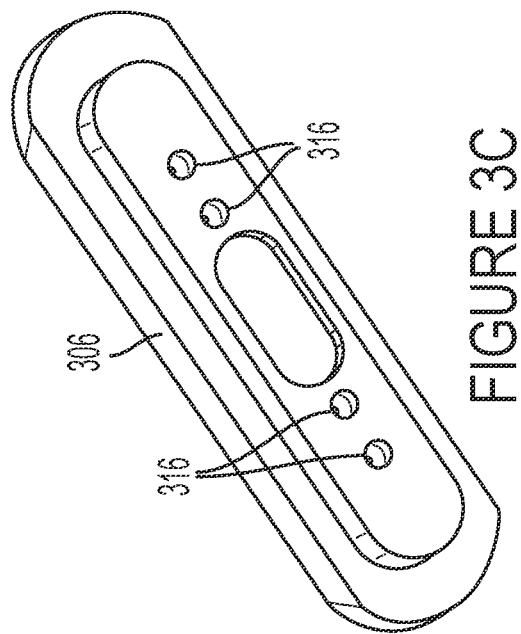

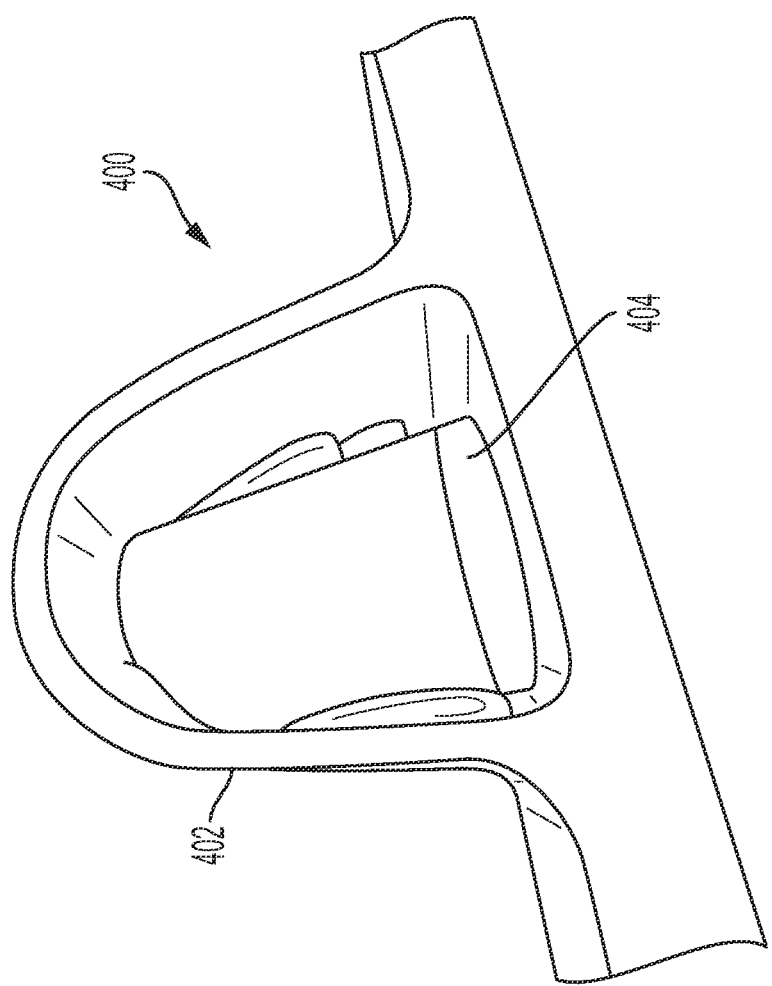

500

INSERT AN INTEGRATED PAIR OF BAFFLES INTO THE VENT STRINGER THROUGH A SLOT IN A CENTER PORTION OF THE VENT STRINGER
— 502

ADD A SEALANT INTO THE VENT STRINGER VIA THE SLOT IN THE CENTER PORTION SUCH THAT THE SEALANT IS COUPLED BETWEEN THE INTEGRATED PAIR OF BAFFLES AND FORMS THE VENT DAM
— 504

FIGURE 5

APPLY AN ELECTRON BEAM TO THE SEALANT TO CAUSE THE SEALANT TO UNDERGO A CURING PROCESS
— 602

FIGURE 6

APPLY HEAT TO THE SEALANT TO CAUSE THE SEALANT TO UNDERGO A CURING PROCESS ─ 702

COUPLE A FASTENER TO THE COMBINATION OF THE SEALANT AND THE INTEGRATED PAIR OF BAFFLES SUCH THAT THE FASTENER PROVIDES ADDITIONAL STRUCTURAL SUPPORT TO THE COMBINATION OF THE SEALANT AND THE INTEGRATED PAIR OF BAFFLES ─ 802

LOW IMPACT HAT STRINGER FLUID DAM

CROSS REFERENCE TO RELATED APPLICATION

The present application is a divisional of U.S. patent application Ser. No. 16/661,514, filed on Oct. 23, 2019, the entire contents of which is hereby incorporated by reference.

FIELD

The present disclosure relates generally to fuel vent systems and more particularly to a vent dam configuration and method for use in a structural fuel vent stringer system of an aircraft.

BACKGROUND

In aircraft construction, composite structures are often used to form various components, such as the fuselage, wings, tail section, and other parts of an aircraft. As such, stringers are often used to provide additional support to these composite structures. In particular, a stringer is a stiffening element to which the skin of the aircraft is joined. In the fuselage, stringers are attached to formers (also referred to as frames) and run in the longitudinal direction of the aircraft. The stringers are primarily responsible for transferring the aerodynamic loads acting on the skin onto the frames and formers. In the wings of the aircraft, stringers run span wise and attach between the ribs. The primary function here is to similarly transfer the bending loads acting on the wings onto the ribs and spar. The stringers on an aircraft might be extruded or bent into shape and can have a number of different cross sections. For instance, conventional shapes for stringers include hat stringers, I-stringers, J-stringers, Y-stringers, and Z-stringers.

SUMMARY

In one example, an aircraft structure is described. The aircraft structure includes a wing and a vent stringer coupled to the wing. The vent stringer includes a center portion positioned between a first section and a second section, and the center portion of the vent stringer includes a slot. The aircraft structure further includes a vent dam coupled within the vent stringer proximate the slot in the center portion. The vent dam comprises a sealant coupled between an integrated pair of baffles such that a combination of the sealant and the integrated pair of baffles prevents fluid communication between the first section and the second section of the vent stringer.

In another example, a method for coupling a vent dam internally within a vent stringer is described. The method involves inserting an integrated pair of baffles into the vent stringer through a slot in a center portion of the vent stringer. The center portion is positioned between a first section and a second section of the vent stringer. The method further involves adding a sealant into the vent stringer via the slot in the center portion such that the sealant is coupled between the integrated pair of baffles and forms the vent dam. A combination of the sealant and the integrated pair of baffles prevents fluid communication between the first section and the second section of the vent stringer.

In an additional example, a system is described. The system includes an aircraft where the aircraft includes a wing. The system also includes a vent stringer coupled to the wing. The vent stringer includes a center portion positioned between a first section and a second section, and wherein the center portion of the vent stringer includes a slot. The system further includes a vent dam coupled within the vent stringer proximate the slot in the center portion. The vent dam comprises a sealant coupled between an integrated pair of baffles such that a combination of the sealant and the integrated pair of baffles prevents fluid communication between the first section and the second section of the vent stringer.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 3A illustrates an integrated pair of baffles coupled to a tool, according to example implementations.

FIG. 3B illustrates another view of the integrated pair of baffles without the tool, according to example implementations.

FIG. 3C illustrate the tool shown in FIG. 3A, according to example implementations.

FIG. 4C illustrates another view of the vent dam coupled within the vent stringer, according to an example implementation.

FIG. 5 shows a flowchart of a method, according to an example implementation.

FIG. 6 shows a flowchart of another method for use with the method shown in FIG. 5, according to an example implementation.

DETAILED DESCRIPTION

Figure 1:
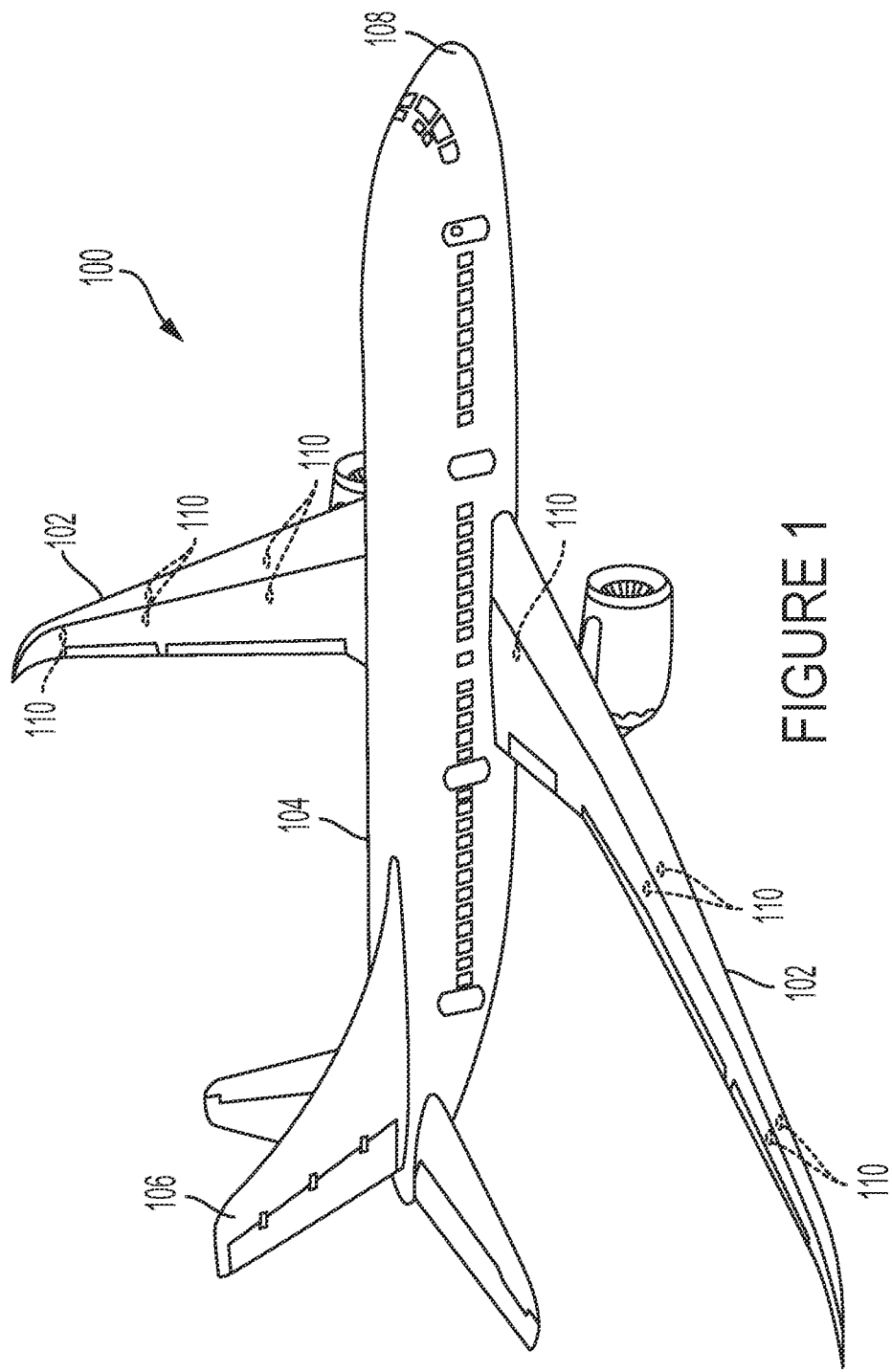
FIG. 1 illustrates a perspective view of an aircraft, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Aircrafts are often constructed with stringers to transfer loads onto components that can handle the increased loads. For instance, stringers, such as inverted-hat shaped stringers may be coupled to the upper skin of the aircraft wings to transfer bending loads on the wings onto the ribs and spar of the aircraft. In addition to adding structural strength to components of the aircraft, some stringers are included to also serve as pipes. For example, a set of stringers may be implemented to vent one or more fuel tanks of an aircraft. Particularly, an aircraft may include one or more vent stringers that are coupled to the tanks positioned on the aircraft's wings, such as tip and surge tanks. The surge tanks may be configured to drain fuel into the main tanks of the aircraft for subsequent use.

One or more vent dams might be used to block fuel from traveling along an entirety of a stringer serving as a pipe. For example, a vent dam may prevent fuel from one tank from traversing a vent stringer and entering into another tank. The vent dams may also enable release of air during the addition or subtraction of fuel from one or more tanks positioned with respect to the vent stringers.

Conventional vent dams often require a large slot or a section of a stringer to be removed to enable installation of a vent dam. Particularly, the rigid components of the vent dam may require enough space to be installed within a vent stringer. These large access slots can be a structural weakness to the stringer and can require increases in local stringer and skin gauges to accommodate the high stress concentrations. In addition, existing vent dam designs typically require multiple interlocking parts, fasteners, and sealant, which together create a more time consuming installation process.

Example implementations presented herein describe methods and systems for installation of low impact hat stringer fluid dams, also referred herein as vent dams. As discussed above, an aircraft may include vent stringers coupled to the aircraft's wings to reduce stress applied to the wings during flight. A vent stringer may include a center portion positioned between a first section and a second section, which each extend longitudinally away from the center portion of the vent stringer. The term "center" is generally used herein to describe a mid-point between the first section and the second section. However, the center portion can also represent any portion of the vent stringer that includes sections extending away from it as well. Thus, the center portion may or may not actually correspond to only the exact mid-point of the vent stringer.

Regardless of the position of the center portion, the center portion may include one or more slots that can be used for installing vent dams. For example, the center portion of a vent stringer may include a slot cut or otherwise constructed into the vent stringer that has a shape and a size designed to enable the installation of example vent dams described herein. For instance, the length of the slot may depend on the shape of the baffles used to create a portion of the vent dam installed within the vent stringer proximate the slot. Once installed, the vent dam may serve as a barrier for air and/or fluid traversing the vent stringer. For example, a vent dam may be used to prevent fluid communication between a first section and a second section of a vent stringer. In some instances, one or more vent dams may be installed within one or more vent stringers to prevent fluid communication between multiple fuel tanks of the aircraft. Similarly, the vent dam may also serve as a boundary between a fuel tank and a dry bay (e.g., a non-fuel tank).

In some examples, the configuration of a vent dam may include a sealant coupled between an integrated pair of baffles. With this configuration, the combination of the sealant and the integrated pair of baffles may prevent fluid communication between opposing sections of the stringer positioned opposite of the vent dam. Installation of a vent dam with this configuration may involve initially inserting the integrated pair of baffles into the vent stringer via a slot in the vent stringer. The integrated pair of baffles may be made of a flexible material that enables the baffles to be compressed during insertion into the vent stringer through the slot and subsequent expansion once the baffles are located within the vent stringer. Unlike conventional vent dams that use rigid components, the compressibility of the integrated pair of baffles allows for the slot cut into the vent dam to be much smaller than the size of slots required for the installation of conventional vent dams. In turn, the structural integrity and strength of the vent stringer is less impacted when using example vent dams described herein compared to conventional vent dams.

When installing the baffles within the vent stringer, the design of each baffle may enable the baffles to form seals with the inner channel of the vent stringer. Particularly, the flexible material of the baffles may cause the baffles to expand and press against the inner channel of the vent stringer to form the set of seals. Sealant may then be subsequently added between the integrated pair of baffles to reinforce the seals created by each baffle.

Various types of sealant may be added between the baffles to create the vent dam, such as acrylic resin, epoxy, polysulfide, and polyurethanes. For example, the sealant may be a polymer material configured to undergo a curing process when coupled between the integrated pair of baffles that causes the sealant to harden. In some instances, the sealant may be initially added between the integrated pair of baffles in a liquid state or quasi-liquid state. This enables the sealant to be added through the slot in the vent stringer. As such, the sealant may subsequently solidify between the integrated pair of baffles. Once solidified, the combination of the sealant and the baffles can prevent the transfer of fluid between the sections of the vent stringer.

As indicated above, some types of sealants used may undergo a curing process to transition from a quasi-solid (or liquid) state to a solid state that helps reinforce the vent dam. The curing process may vary and can depend on the type of sealant used. For instance, some sealants may use an application of electron beams to undergo the curing process. In other examples, the curing process may involve chemical additives added to the sealant that cause the sealant to harden or an application of heat to the sealant. Additional configurations are described below.

Referring now to the Figures, FIG. 1 illustrates a perspective view of an aircraft, according to an example implementation. The aircraft 100 is shown implemented with a set of wings 102, a fuselage 104, a tail 106, and a nose 108. In addition, one or more vent dams 110 may be coupled on one or both wings 102. For example, vent dams 110 may be positioned based on the layout of fuel tanks and other components within the wings 102. The wings 102 may include one or more fuel tanks (e.g., surge tanks) that can carry fuel for use by the aircraft engines during flight. As such, the wings 102 may include one or more stringers, such as one or more hat stringers serving as pipes that connect one or more fuel tanks (or dry bays) of the aircraft. In other embodiments, the aircraft 100 can have other configurations.

For the fuselage 104 of the aircraft 100, a set of stringers may be attached to frames and oriented in the longitudinal direction of the aircraft 100. The fuselage 104 may include these stringers to transfer the aerodynamic loads acting on the skin onto the frames and formers of the fuselage 104. For the set of wings 102 of the aircraft 100, a set of stringers may run span-wise (from wing root to wing tip) and attach between the ribs. The stringers may function to transfer the bending loads acting on the wing 102 onto the ribs and spar of the aircraft 100.

Figure 2A:
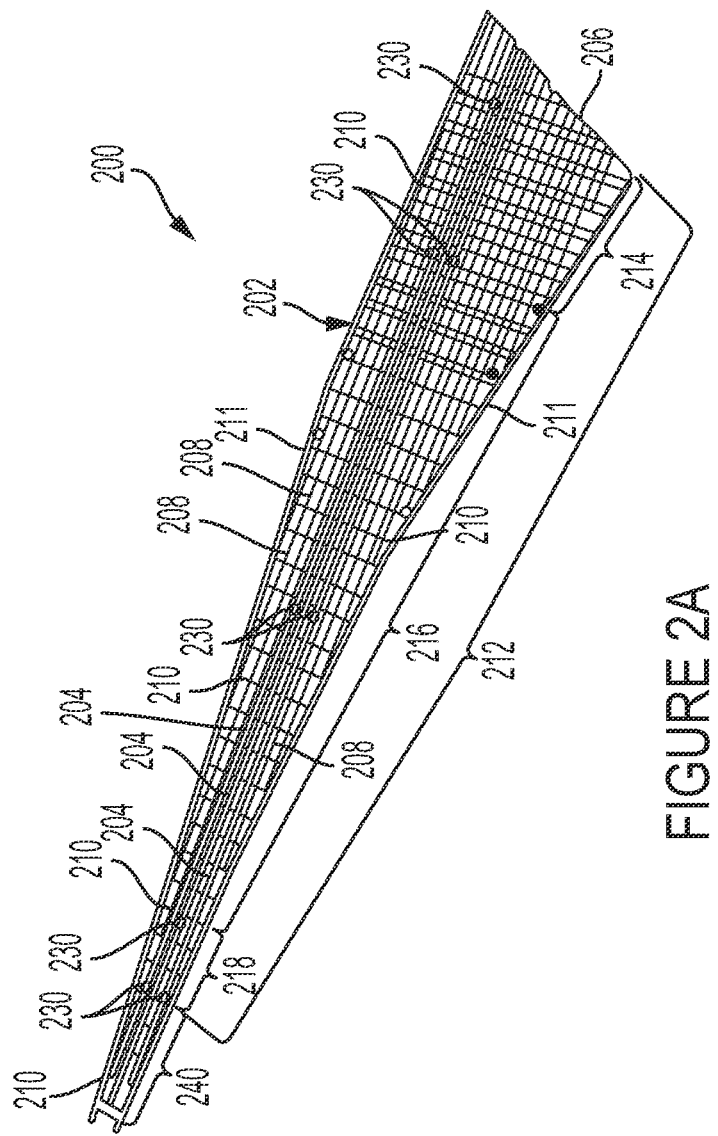
FIG. 2A illustrates atop view of a vent stringer system, according to an example implementation.

FIG. 2A illustrates a top view of a fuel vent system, according to an example embodiment. The top view shows a portion of a fuel vent system 200 that may represent a portion of a left aircraft wing box 202 associated with the left wing of the aircraft (e.g., the aircraft 100 shown in FIG. 1). Particularly, the top view further illustrates potential locations for vent stringers 204 within the left aircraft wing box 202 as well as example positions for vent dams 230 used with the vent stringers 204.

As shown in FIG. 2A, the end 206 of the left aircraft wing box 202 is attached to the fuselage of the aircraft (e.g., the fuselage 104 shown in FIG. 1). As such, the fuel vent system 200 may include vent stringers 204, non-vent stringers 208, and ribs 210. The non-vent stringers 208 may be similar to the vent stringers 204, but not used as pipes to transfer fuel or other fluids. In other examples, the vent stringers 204 and the non-vent stringers 208 may have different configurations.

The vent stringers 204 may exist within and/or connect one or more fuel tanks 212. In the example shown in FIG. 2A, the vent stringers 204 exist within a center wing tank 214, a main wing tank 216, and a surge tank 218 that are part of the left aircraft wing box 202. As such, each fuel tank 212 may use one or more vent stringers 204 to move fluid, such as fuel for the aircraft. The fuel tanks 212 may be bound by ribs 210, spars 211, and wing skins (not shown). In some instances, one or more fuel tanks 212 may be a dry bay.

One or more vent dams 230 may be used with the fuel vent system 200. In the embodiment shown in FIG. 2A, the fuel vent system 200 includes eight vent dams 230 arranged at various locations on the vent stringers 204. In other embodiments, the fuel vent system 200 may include more or fewer vent dams. In some instances, the quantity of vent dams may depend on the type of aircraft. In addition, the quantity of vent dams in each wing of the aircraft may be the same or differ within embodiments.

Figure 2B:
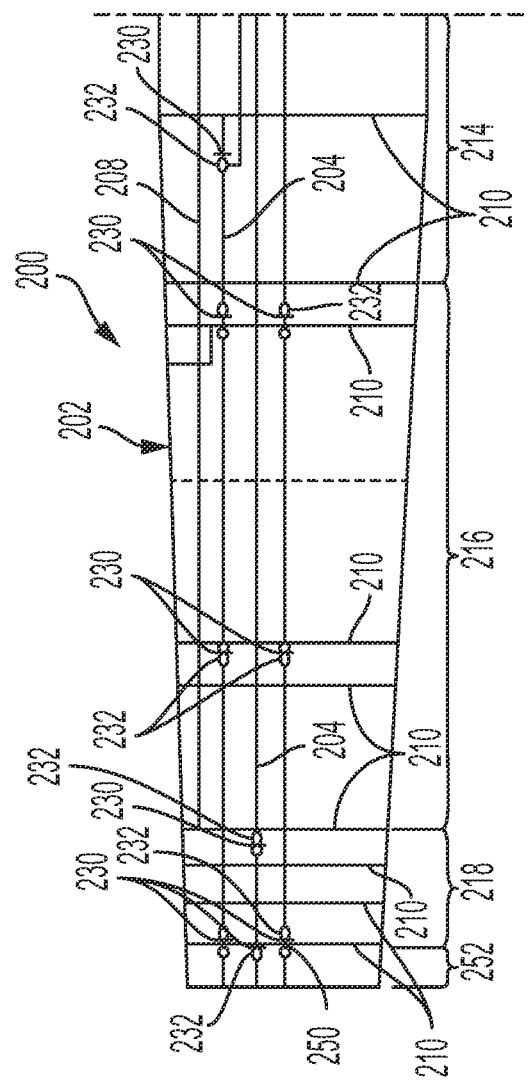
FIG. 2B illustrates a top close-up view of the vent stringer system shown in FIG. 2A, according to an example implementation.

FIG. 2B illustrates a top close-up view of the fuel vent system shown in FIG. 2A according to example implementations. Particularly, the top close-up view depicts an example arrangement for vent stringers 204, non-vent stringers 208, and ribs 210 as well as the center wing tank 214, the main wing tank 216, the surge tank 218, and a flammable leakage zone 240 with respect to the fuel vent system 200. The various vent dams 230 shown in FIG. 2B may be inserted through the slots 232 positioned in the vent stringer 204 during installation of each vent dam. In addition, a barrier 250 may be positioned between the surge tank 218 and the flammable leakage zone 252 as shown.

FIG. 3A illustrates an integrated pair of baffles coupled to a tool, according to example implementations. The integrated pair of baffles 300 includes a left baffle 302 and a right baffle 304 linked together by a connection 308 and arranged in a butterfly configuration. In addition, the left baffle 302 is shown coupled to a tool 306 that may be used to insert and install the integrated pair of baffles 300 into a stringer or another structure. Although the integrated pair of baffles 300 is shown with two baffles (i.e., the left baffle 302 and the right baffle 304), other implementations can include a different quantity of baffles in another arrangement. For example, another set of integrated baffles may include three or more baffles coupled together via one or more connections.

Each baffle 302, 304 within the integrated pair of baffles 300 is shown shaped such that insertion of the integrated pair of baffles 300 inside a vent stringer can cause each baffle 302, 304 to press against the inner channel to form a set of seals within the vent stringer (installation into a vent stringer against the inner channel is shown below in FIGS. 4A-4B). Particularly, by pressing against the inner channel, the integrated pair of baffles 300 can block liquid, air, or other materials from moving through the vent stringer. As such, the exterior shape of the baffles 302, 304 may vary within examples. In some instances, the exterior shape of each baffle 302, 304 depends on the shape of the inner channel of the vent stringer to enable the integrated pair of baffles 300 to press against the inner channel and form the seal. As a result, the seal could help form a vent dam that blocks movement of air and/or liquid from one section to another section of a stringer.

The left baffle 302 and the right baffle 304 are coupled together at connection 308 to form the integrated pair of baffles 300. The connection 308 can enable the left baffle 302 and the right baffle 304 to be folded together. For example, the connection 308 may enable folding the integrated pair of baffles 300 within a stringer such that the left baffle 302 and the right baffle 304 are placed together with a small gap in between for sealant.

Sealant can be added between the folded together baffles 302, 304 to further enhance and establish a vet dam that blocks fluid and/or air from traveling through a vent stringer. Sealant is a substance used to block the passage of fluids through the openings in materials. Various types of sealants can be used within examples, such as silicone, polyurethane, polysulfide, and silane-modified polymers. In other examples, sealing putties, tapes, or physically reactive types of sealant (e.g., solvent-containing or water-based) may be used. In addition, the integrated pair of baffles 300 may be made out of one or more materials within examples. For instance, the integrated pair of baffles 300 can be made out of elastic materials to enable folding and flexing of the baffles 302, 304 to allow efficient insertion into stringers and other structures.

FIG. 3B illustrates another view of the integrated pair of baffles without the tool, according to example implementations. In the view shown in FIG. 3B, the integrated pair of baffles 300 is shown with coupling points 310 positioned on the baffle extensions 312, 314 of each baffle 302, 304, respectively. Particularly, the coupling points 310 on the baffle extension 312 of the left baffle 302 are used to couple to the tool 306 in FIG. 3A. Similarly, the coupling points 310 on the baffle extension 314 of the right baffle 304 may be used to couple to the tool 306 as well.

In some examples, both sets of coupling points 310 may be used to couple the integrated pair of baffles 300 to the tool during installation within a vent stringer. For instance, the coupling points 310 may be used to couple the baffle extension 312 to a first side of the tool 306 and the baffle extension 314 to a second side of the tool 306. In other examples, other types of coupling structures may be used to couple the integrated pair of baffles 300 to the tool 306.

FIG. 3C illustrate the tool shown in FIG. 3A, according to example implementations. As shown, the tool 306 may be designed to assist a user insert and install the integrated pair of baffles 300 within a vent stringer. The tool 306 may have a curved design that enables easier use by a user. In addition, the tool 306 is shown with coupling holes 316 that may be used to connect the tool 306 with the coupling points 310 of one or more baffles (e.g., the left baffle 302 or the right baffle 304). Other types of tools may be used for installing the integrated pair of baffles 300 within a vent stringer or another structure.

Figure 4B:
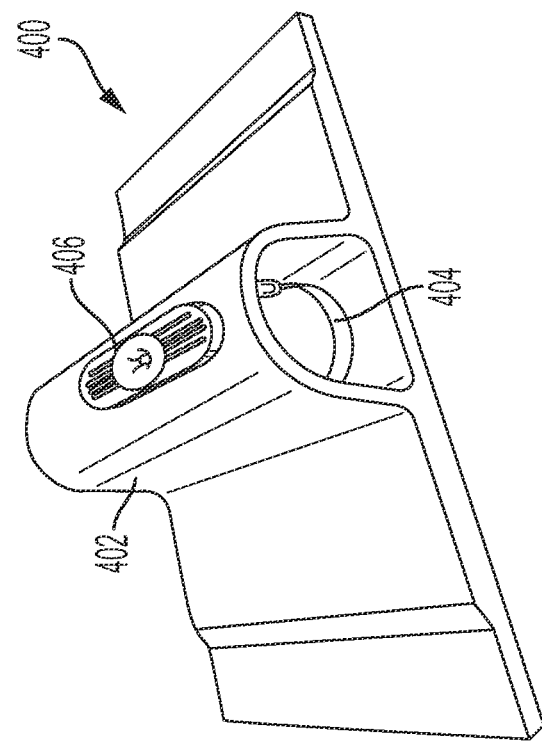
FIG. 4B illustrates a top view of the vent dam coupled within the vent stringer, according to an example implementation.
Figure 4A:
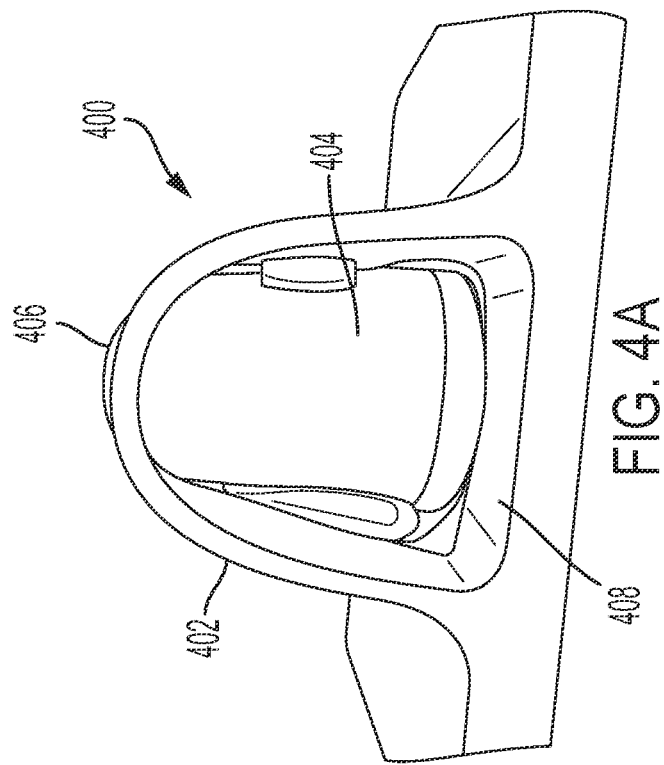
FIG. 4A illustrates a front view of a vent dam coupled within a vent stringer, according to an example implementation.

FIG. 4A illustrates a front view of a vent dam coupled within a vent stringer, according to an example implementation. The system 400 shows a vent stringer 402, a vent dam 404, and a fastener 406. In particular, the vent dam 404 is shown coupled within the inner channel 408 of the vent stringer 402. In such a position, the vent dam 404 can prevent fluid communication through that portion of the vent stringer 402.

Installation of the vent dam 404 may involve inserting one or more baffles (e.g., the integrated pair of baffles 300) through a slot (not shown) in the vent stringer 402. In particular, using flexible baffles that can collapse during entry through the slot and expand once within the vent stringer 402 enables the size of the use of a small slot (e.g., 3-6 centimeters) in the vent stringer 402. This differs from other types of vent dams constructed of rigid components that typically require larger holes in vent stringers for installation.

In addition, FIG. 4A further shows the fastener 406 coupled to the vent dam 404. In some examples, the fastener 406 is not required for installation or use of the vent dam 404. In such examples, the fastener 406 may be included to provide additional structural support to the combination of the sealant and the integrated pair of baffles (i.e., the vent dam 404). In addition, the fastener 406 may be included to represent the location of the vent dam 404 within the vent stringer 402.

In some examples, the fastener 406 may be implemented as the tool that is used to install the baffles within the vent stringer 402. For instance, the fastener 406 may be the tool 306 shown in FIGS. 3A and 3C.

FIG. 4B illustrates a top view of the vent dam coupled within the vent stringer, according to an example implementation. The fastener 406 is shown covering the slot in the vent stringer 402. FIG. 4B further shows the curvature of a baffle of the vent dam 404. The curvature may arise in the integrated pair of baffles as a result of pressure from sealant added to create the vent dam 404. The sealant may be added to re-enforce the seal initially created by the insertion of the integrate pair of two or more baffles. The combination of the baffles and sealant can create a vent dam 404 fixed in position and capable of blocking fluid communication between sections extending away from the vent dam 404. In addition, FIG. 4C illustrates another view of the vent dam coupled within the vent stringer, according to an example implementation. Particularly, a baffle of the vent dam 404 is shown within the vent stringer 402 to create the system 400.

FIG. 5 shows a flowchart of a method, according to an example implementation. The method 500 presents an example method for coupling a vent dam internally within a vent stringer. The method 500 could be used with the aircraft 100 shown in FIG. 1 or another type of aircraft or vehicle. In other examples, components of the devices and/or systems may be arranged to be adapted to, capable of, or suited for performing the functions, when operated in a specific manner.

The method 500 can include one or more operations, functions, or actions as illustrated by one or more of blocks 502 and 504. Although the blocks are illustrated in a particular order, these blocks may also be performed in parallel, and/or in a different order than those described herein. Also, the various blocks may be combined into fewer blocks, divided into additional blocks, and/or removed based upon the desired implementation.

At block 502, the method 500 involves inserting an integrated pair of baffles into the vent stringer through a slot in a center portion of the vent stringer. The integrated pair of baffles may be arranged in a butterfly configuration, such as the integrated pair of baffles 300 shown in FIGS. 3A-3C.

The center portion may be positioned between a first section and a second section of the vent stringer. For instance, the vent stringer may be a tubular structure having an inner channel. As such, the first section and the second section of the vent stringer may extend longitudinally away from the center portion of the vent stringer and along the wing of the aircraft. In addition, the slot in the center portion may extend through an exterior of the tubular structure and to the inner channel. In other examples, the center portion can correspond to other portions of the vent stringer.

In some examples, inserting the integrated pair of baffles into the vent stringer through the slot may involve compressing the integrated pair of baffles during insertion of the integrated pair of baffles into the vent stringer through the slot in the center portion. For example, the integrated pair of baffles may be made out of a flexible material such that the integrated pair of baffles compress during insertion through the slot and into the inner channel of the vent stringer. The integrated pair of baffles may then subsequently expand within the inner channel causing each baffle to press against the inner channel.

At block 504, the method 500 involves adding a sealant into the vent stringer via the slot in the center portion such that the sealant is coupled between the integrated pair of baffles and forms the vent dam. Particularly, a combination of the sealant and the integrated pair of baffles can prevent fluid communication between the first section and the second section of the vent stringer.

In some examples, the sealant is added into the vent stringer via the slot in the center portion when the sealant is in a quasi-solid state. For instance, the sealant may be a polymer material configured to undergo a curing process when coupled between the integrated pair of baffles that causes the sealant to harden. The sealant may be initially added between the integrated pair of baffles in a liquid state and subsequently solidify such that the sealant is coupled between the integrated pair of baffles.

FIG. 6 shows a flowchart of a method for use with the method 500, according to an example implementation. Block 602 involves applying an electron beam to the sealant to cause the sealant to undergo a curing process. Particularly, the curing process that uses an application of electron beam or beams can cause the sealant to harden between the integrated pair of baffles.

Figure 7:
FIG. 7 shows an additional flowchart of a further method for use with the method shown in FIG. 5, according to an example implementation.

FIG. 7 shows another flowchart of a further method for use with the method 500, according to an example implementation. Block 702 involves applying heat to the sealant to cause the sealant to undergo a curing process. As such, the curing process involving an application of heat can cause the sealant to harden between the integrated pair of baffles. In other examples, the sealant may include a chemical additive that causes solidification once the sealant is positioned between the integrated pair of baffles.

Figure 8:
FIG. 8 shows another flowchart of a method for use with the method shown in FIG. 5, according to an example implementation.

FIG. 8 shows yet another flowchart of a method for use with the method 500, according to an example implementation. Block 802 involves coupling a fastener to the combination of the sealant and the integrated pair of baffles such that the fastener provides additional structural support to the combination of the sealant and the integrated pair of baffles.

By the term "substantially" or "about" used herein, it is meant that the recited characteristic, parameter, or value need not be achieved exactly, but that deviations or variations, including for example, measurement error, measurement accuracy limitations, friction, and other factors known to skill in the art, may occur in amounts that do not preclude and/or occlude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for coupling a vent dam internally within a vent stringer, the method comprising:
    inserting an integrated pair of baffles into the vent stringer through a slot in a center portion of the vent stringer via at least one of compressing, folding, and collapsing the integrated pair of baffles during insertion, wherein the center portion is positioned between a first section and a second section of the vent stringer; and
    adding a sealant into the vent stringer via the slot in the center portion such that the sealant is coupled between the integrated pair of baffles and forms the vent dam, wherein a combination of the sealant and the integrated pair of baffles prevents fluid communication between the first section and the second section of the vent stringer.

2. The method of claim 1, wherein inserting the integrated pair of baffles into the vent stringer through the slot in the center portion of the vent stringer comprises:
    compressing the integrated pair of baffles together during insertion of the integrated pair of baffles into the vent stringer through the slot in the center portion.

3. The method of claim 1, wherein inserting the integrated pair of baffles into the vent stringer through the slot in the center portion of the vent stringer comprises:
    inserting the integrated pair of baffles having a butterfly configuration into the vent stringer through the slot in the center portion of the vent stringer.

4. The method of claim 3, wherein inserting the integrated pair of baffles having the butterfly configuration into the vent stringer through the slot in the center portion of the vent stringer comprises:
    folding a left baffle and a right baffle of the butterfly configuration together during insertion of the integrated pair of baffles into the vent stringer through the slot in the center portion.

5. The method of claim 4, further comprising:
    using a tool coupled to the left baffle to insert the integrated pair of baffles into the vent stringer through the slot in the center portion.

6. The method of claim 1, wherein adding the sealant into the vent stringer via the slot in the center portion comprises:
    adding a silicone sealant or polyurethane sealant into the vent stringer via the slot in the center portion.

7. The method of claim 1, wherein adding the sealant into the vent stringer via the slot in the center portion comprises:
    adding a polymer material into the vent stringer via the slot in the center portion, wherein the polymer material is configured to undergo a curing process when coupled between the integrated pair of baffles.

8. The method of claim 7, further comprising:
    adding chemical additives to the polymer material to cause the polymer material to harden between the integrated pair of baffles.

9. The method of claim 1, wherein adding the sealant into the vent stringer via the slot in the center portion comprises:
    adding the sealant into the vent stringer via the slot in the center portion when the sealant is in a liquid state.

10. The method of claim 1, wherein adding the sealant into the vent stringer via the slot in the center portion comprises:
    adding the sealant into the vent stringer via the slot in the center portion when the sealant is in a quasi-solid state.

11. The method of claim 1, further comprising:
    applying an electron beam to the sealant to cause the sealant to undergo a curing process, wherein the curing process causes the sealant to harden between the integrated pair of baffles.

12. The method of claim 1, further comprising:
    applying heat to the sealant to cause the sealant to undergo a curing process, wherein the curing process causes the sealant to harden between the integrated pair of baffles.

13. The method of claim 1, further comprising:
    coupling a fastener to the combination of the sealant and the integrated pair of baffles such that the fastener provides additional structural support to the combination of the sealant and the integrated pair of baffles.

14. The method of claim 1, wherein the integrated pair of baffles are made out of one or more elastic materials that enable folding and flexing of the integrated pair of baffles.

15. The method of claim 1, wherein the vent stringer is a tubular structure having an inner channel, and
    wherein the slot extends through an exterior of the tubular structure and to the inner channel of the vent stringer.

16. The method of claim 15, wherein the integrated pair of baffles is made out of a flexible material configured to compress during insertion through the slot and into the inner channel of the vent stringer and subsequently expand within the inner channel.

17. The method of claim 16, wherein each baffle of the integrated pair of baffles is shaped such that insertion of the integrated pair of baffles inside the vent stringer causes each baffle to both press against the inner channel to form a seat of seals within the vent stringer.

18. The method of claim 1, wherein inserting the integrated pair of baffles into the vent stringer through the slot in the center portion comprises:
    folding the integrated pair of baffles together with a small gap in between for the sealant.

19. The method of claim 1, wherein adding the sealant into the vent stringer via the slot in the center portion comprises:
    adding a silane-modified polymer as the sealant.

20. The method of claim 1, wherein adding the sealant into the vent stringer via the slot in the center portion comprises:
    using a sealing putty as the sealant.

* * * * *